United States Patent
Gildert et al.

(10) Patent No.: US 10,671,240 B2
(45) Date of Patent: Jun. 2, 2020

(54) SYSTEMS, DEVICES, ARTICLES, AND METHODS FOR CREATING AND USING TRAINED ROBOTS WITH AUGMENTED REALITY

(71) Applicant: Kindred Systems Inc., San Francisco, CA (US)

(72) Inventors: Suzanne Gildert, Burnaby (CA); Geordie S. Rose, Vancouver (CA); Dmytro Korenkevych, Burnaby (CA); Miles F. H. Steininger, Vancouver (CA)

(73) Assignee: KINDRED SYSTEMS INC., San Francisco, CA (US)

( * ) Notice: Subject to any disclaimer, the term of this patent is extended or adjusted under 35 U.S.C. 154(b) by 0 days.

(21) Appl. No.: 16/000,375

(22) Filed: Jun. 5, 2018

(65) Prior Publication Data

US 2018/0349702 A1    Dec. 6, 2018

Related U.S. Application Data

(60) Provisional application No. 62/515,450, filed on Jun. 5, 2017.

(51) Int. Cl.
*G06F 3/0481* (2013.01)
*G06K 9/00* (2006.01)
(Continued)

(52) U.S. Cl.
CPC ........ *G06F 3/04815* (2013.01); *B25J 9/1697* (2013.01); *B25J 13/089* (2013.01); *B25J 19/023* (2013.01); *G06K 9/00671* (2013.01); *G06T 17/00* (2013.01); *G06T 19/006* (2013.01); *B25J 5/007* (2013.01); *G06T 7/00* (2013.01)

(58) Field of Classification Search
CPC ............ G06F 3/04815; G06K 9/00671; B25J 13/089; G06T 17/00; G06T 19/006
See application file for complete search history.

(56) References Cited

U.S. PATENT DOCUMENTS

| | | | | |
|---|---|---|---|---|
| 7,298,385 | B2* | 11/2007 | Kazi | B25J 9/1671 345/633 |
| 2016/0257000 | A1* | 9/2016 | Guerin | B25J 9/1605 |

OTHER PUBLICATIONS

Harris, Tom, "How Robots Work—Autonomous Robots", https://web.archive.org/web/20160221144237/https://science.howstuffworks.com/robot4.htm, Feb. 21, 2016 (Year: 2016).*

* cited by examiner

*Primary Examiner* — Michelle L Sams
(74) *Attorney, Agent, or Firm* — Seed IP Law Group LLP

(57) ABSTRACT

Substantially as described and illustrated herein including devices, methods of operation for the systems or devices, articles of manufacture including stores processor-executable instructions, and a system including a robot. The system includes at least one processor. The system may further include a nontransitory processor-readable storage device communicatively coupled to at least one processor and which stores processor-executable instructions which, when executed by the at least one processor, cause the at least one processor to composite environment information that represents an environment and virtual item information that represents the virtual item to produce composited information, present to an agent the composited information, and receive action information that represents an action for the robot to perform via the output system.

20 Claims, 9 Drawing Sheets

(51) Int. Cl.
*B25J 13/08* (2006.01)
*B25J 19/02* (2006.01)
*B25J 9/16* (2006.01)
*G06T 17/00* (2006.01)
*G06T 19/00* (2011.01)
*B25J 5/00* (2006.01)
*G06T 7/00* (2017.01)

SYSTEMS, DEVICES, ARTICLES, AND METHODS FOR CREATING AND USING TRAINED ROBOTS WITH AUGMENTED REALITY

BACKGROUND

Technical Field

This disclosure generally relates to the field(s) of machine learning, data collection, augmented reality, and/or operation of robots.

Description of the Related Art

Robots

Robots are systems, machines, or devices that are capable of carrying out one or more tasks. A robot is an electromechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

Machine Learning

A computer, which is a machine, can perform or succeed at one or more related tasks as defined by a measure. The computer learns if after exposure to information characterizing an event the computer improves under the measure at performing the one or more related tasks. Further, the computer learns without updates to any processor-executable instructions by imperative programming.

Augmented Reality

Augmented reality describes systems, devices, articles, and methods that allow the user, such as, a human operator, to experience the real world providing an interactive representation of the real world composited with a representation of one or more virtual items. For example, a signal representing a virtual item is overlaid on or augmented in a representation of an environment based on data from one or more sensors. Augmented reality supplements reality, rather than completely replacing it. Some people define augmented reality systems, devices, articles, and methods as those that combine presentations of the real and the virtual, and are interactive in real time. Traditionally augmented reality is focused on visual representations, but similar techniques exists for audio and haptic representations. The haptic sense may be divided into the kinaesthetic sense (e.g., force, motion) and the tactile sense (e.g., tact, touch). These can be used to augment, in real-time, a haptic display providing a representation of an environment received from one or more sensors. The components of the haptic representation include environment component and virtual item component. Each component can have spatially localized attributes. An example of audio augmented reality includes a positioning system and a wearable device that plays contextually appropriate sounds, e.g., in certain locations. Some people define augmented reality methods as including those that superimposition generated sensory input on top of sensory input from the real world.

BRIEF SUMMARY

A system including a robot that includes an input subsystem and an output subsystem, and at least one processor communicatively coupled to the input subsystem and the output subsystem. The system further includes at least one nontransitory processor-readable storage device communicatively coupled to the at least one processor and which stores processor-executable instructions which, when executed by the at least one processor, cause the at least one processor to receive, at the input subsystem, at least one input signal from at least one sensor wherein the signal includes environment information that represents an environment to the robot. The processor-executable instructions which, when executed by the at least one processor, cause the at least one processor to create virtual item information that represents a virtual item and composite the environment information that represents an environment and the virtual item information that represents the virtual item to produce composited information. The processor-executable instructions which, when executed by the at least one processor, cause the at least one processor to present to an agent the composited information, and receive action information that represents an action for the robot to perform via the output system. The processor-executable instructions which, when executed by the at least one processor, cause the at least one processor to create at least one output signal that includes information that represents an action for the robot to preform via the output subsystem.

A method of operation for a system including at least one processor, at least one sensor in communication with the at least one processor, and a robot including an output subsystem in communication with the at least one processor. The method includes receiving, at the at least one processor, at least one input signal from the at least one sensor wherein the signal includes environment information that represents an environment to the robot, creating, by the at least one processor, item information that represents a virtual item, and compositing, by the least one processor, the environment information that represents the environment to the robot and the item information that represents the virtual item to produce composited information that represents the environment to the robot and the item information that represents the virtual item. The method includes presenting, by the at least one processor, the composited information to an agent, and receiving, by the at least one processor, action information that represents an action for the robot to perform via the output subsystem. The method further includes generating, by the at least one processor, at least one output signal that includes the action information that represents the action for the robot to perform via the output subsystem.

A system including at least one sensor, a compositor, and an agent may be summarized substantially as described and illustrated herein.

A device may be summarized substantially as described and illustrated herein.

A processor-readable storage device including processor-executable instructions which when executed causes a processor to train an agent, validate the agent, or test the agent with augmented reality data substantially as described and illustrated herein.

A method of operation substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

Systems, devices, articles, and methods are described in greater detail herein with reference to the following figures in which.

DETAILED DESCRIPTION

Figure 1:
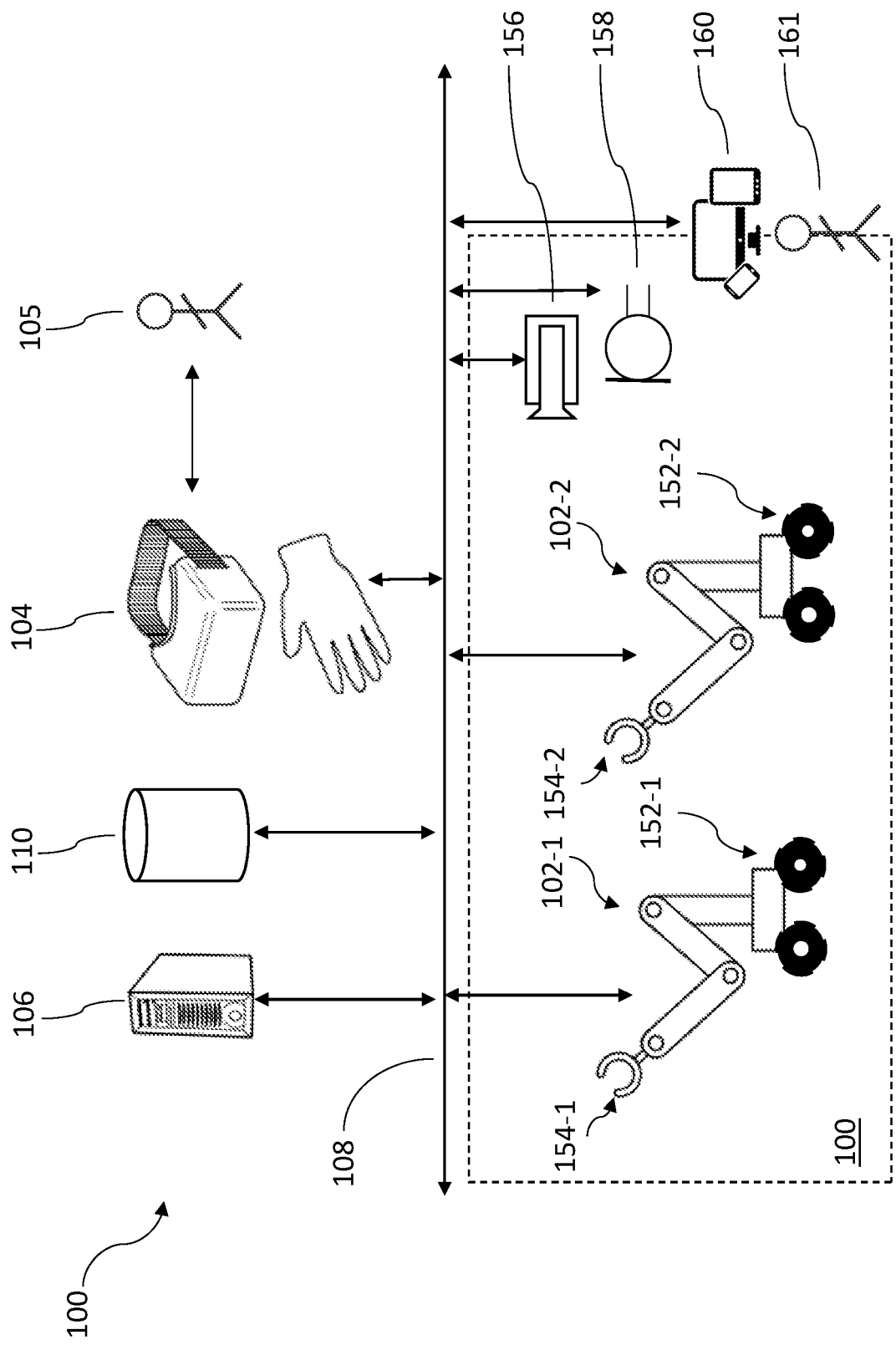
FIG. 1 is a schematic diagram illustrating a portion of a robotic system.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, and the like are not shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an action" includes an action, or two or more actions. It should also be noted that the term "or" is generally employed in its sense including "and/or" unless the content clearly dictates otherwise.

The headings provided herein are for convenience only and do not interpret the scope or meaning of the embodiments.

Training artificial intelligence systems, devices, articles, and methods takes much training data and, thus, time. Creating this training data can be expensive and for some scenarios infeasible, e.g., actually crashing robot driven cars is impractical. Often when real training data is not available simulation data is used, consider, using a flight simulator for pilot training. However, getting good simulations of the real world often takes complicated software based on mathematical techniques, such as, numerically solving Differential Algebraic Equations—systems of coupled differential (or difference) equations coupled to algebraic equations expressing constraints. Thus, simulation data is also limited by time, expense, and practicality.

As disclosed herein one can train agents embodied in systems, devices, articles, and methods in the following way. Present to the agents augmented reality data, for example, simulation data along with the sensory data (e.g., composite data). Track the responses of the agents. The responses may be implemented in the real world, for example, a physical car driving on a physical road, but potentially on a closed course. The response however could break or be suboptimal in view of certain possible events or occurrences, e.g., an image of toddler on a tricycle on or near the road. The approach described herein is useful for acquiring data for rare events or events that are impractical to simulate in a computer or in real life. For example, a threat can be injected into the sensory data via the simulation data. This way is useful to train, validate, and test agents including agents used to control robots.

FIG. 1 shows an exemplary system 100 in accordance with the present systems, devices, articles, and methods. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater number of robots (102) and/or computer systems (106). In some implementations, system 100 includes a nontransitory computer- and processor-readable storage device 110.

Robots 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can selectively pilot one or both of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robots 102 or other robot(s). Robots 102 operate in, and receive data about, an environment 140 that comprises a physical space. The term "about" is employed here in the sense of represent, characterize, or summarize. The data about, an environment 140 is received from one or more sensors. In some implementations, the one or more sensors are on robots 102. In some implementations, the one or more sensors are external to robots 102, such as, camera 156, microphone 158.

In piloted mode, robots 102 execute robot control instructions in real-time (e.g., without added delay) as received from the operator interface 104 without taking into account or revision by the controller based on sensed information.

In some implementations, robots 102, operate without an operator interface 104 or human operator, e.g., autonomously. Robots 102 may operate in an autonomous control mode by executing autonomous control instructions. For example, computer system 106 or robots 102 can use sensor data from one or more sensors associated with operator generated robot control instructions and the operator generated robot control instructions from one or more times robots 102 was in piloted mode to generate autonomous robot control instructions for subsequent use. For example, by using deep learning techniques to extract features from the sensor data such that in autonomous mode the robots 102 autonomously recognize features and/or conditions in its environment and in response perform a defined act, set of acts, a task, or a pipeline of tasks. Exemplary acts include recognizing the presence of a red ball, or any colour ball, depending on the features extracted from the sensor data, and kicking the ball. In the absence of a ball, the robot executing the autonomous robot control instructions would not kick the air as if a ball was present.

In some implementations, the computer system 106 is a smaller processor based device like a mobile phone, single board computer, embedded computer, and the like. The computer system 106 may, in some instances, be termed or referred to interchangeably as a computer, server, or an analyzer 106. Computer system 106 may create autonomous control instructions for robots 102 or another robot. In some implementations, robots 102 autonomously recognize features and/or conditions in its environment as represented by a representation (e.g., presentation, depiction) of the environment and one or more virtual items composited into the environment, and in response being presented with the representation perform one or more actions or tasks. In some implementations, robots 102 autonomously recognize features and/or conditions in a representation of the environment including a representation of one more items in the environment composited into a virtual environment.

In some instances, robots 102 may be controlled autonomously at one time, while being piloted, operated, or controlled by a human operator at another time. That is, operate under an autonomous control mode and change to operate under a piloted mode (i.e., non-autonomous). In a third mode of operation robots 102 can replay or execute piloted robot control instructions in a human operator controlled (or piloted) mode. That is operate without sensor data and replay pilot data.

A robot, like robots 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot typically includes a propulsion or motion subsystem comprising of one or more motors, solenoids or other actuators, and associated hardware (e.g., drivetrain, wheel(s), treads) to propel the robot in a physical space. An example of a motion subsystem is a set of drivetrain and wheels, such as, drivetrain and wheels 152-1, 152-2 (collectively 152) of robot 102-1, 102-2, respectively. The space does not need to be horizontal or terrestrial. Examples of spaces include water, air, underground, vertical spaces, outer space and the like.

A robot typically includes a manipulation subsystem comprising one or more appendages, such as, one or more arms and/or one or more associated end-effectors, arm and end-effector 154-1, 154-2 (collectively 154) of robot 102-1, 102-2. An end-effector is a device attached to a robotic arm designed to interact with the environment. End-effectors for robot operating in unstructured environments are devices of complex design. Ideally, these are capable of performing many tasks, including for example grasp, grip, physically releasably engage, or otherwise interact with an item.

System 100 includes a sensor subsystem comprising one or more sensors, such as, one or more imagers or cameras 156, and/or one or more microphones 158. (Robots 102 may include an onboard sensor subsystem. See examples, disclosed herein at, at least, FIG. 2 and FIG. 4.)

System 100 may include a sensor subsystem which acquires data that characterizes or represents the robots 102 in a context or scenario, and/or performing one or more tasks. The data includes environmental sensor information, or environment information, representative of environmental conditions external to robots 102.

System 100 includes an observer interface system. System 100 includes one or more observer interfaces 160 coupled to network or non-network communication channel 108. The observer interfaces 160 include input or output parts. An example of an output part is a display of explanatory text or a dynamic representation of robots 102 in a context or scenario. For example, the dynamic representation robot includes video and audio feed, for instance a computer-generated animation. Useful video and audio formats include H264 and Opus respectively. Example of an input part includes a WIMP interface. An observer 161 may observe or monitor the operation of system 100, robots 102 or the like from observer interfaces 160.

Figure 2:
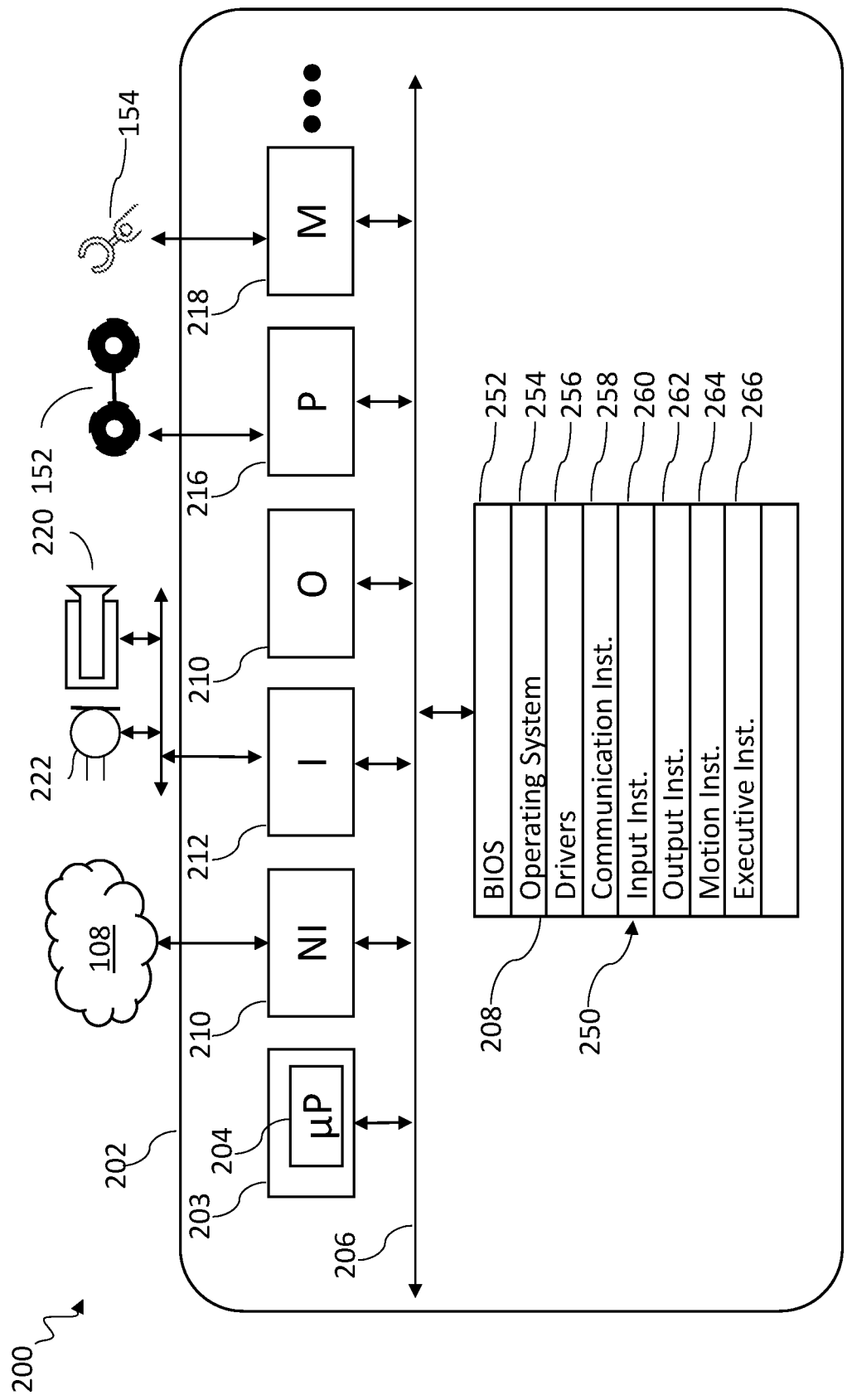
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with the present systems, devices, articles, and methods. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends data related partition of a plurality of items. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI™ compliant, BLUETOOTH™ compliant, cellular (e.g., GSM, CDMA), and the like. Suitable transportation protocols include TCP/IP, SCTP, and DCCP.

Robot 200 includes an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like. The input subsystem 212 may create environment information that represents the environment to the robot 200. Environment information is further described herein at, at least, FIG. 4, FIG. 5, and FIG. 6.

Robot 200 includes an output subsystem 214 comprising output devices, such as, speakers, lights, and displays. In some implementations, the output subsystem 214 includes a propulsion or motion subsystem 216 and/or a manipulation subsystem 218. The robot 200 may use the output subsystem 214 to perform one or more actions. A robot performing an action is further described herein at, at least, FIG. 1, FIG. 4, FIG. 5, and FIG. 7. The one or more actions may performed in response to executing autonomous processor-executable robot control instructions, and operator generated processor-executable robot control instructions.

Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 includes a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, end-effectors, associated motors, solenoids, other actuators, linkages, drive-belts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations the output subsystem 214 includes propulsion or motion subsystem 216 and/or manipulation subsystem 218. In some implementations, the input subsystem 212 includes the network interface subsystem 210. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. That is, a robot, like robot 200, could in some implementations, have a processor in a left arm and a storage device in its thorax. In some implementations, computational resources are located in the interstitial spaces between structural or mechanical components of the robot 200. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions, e.g., identify and manipulate items. Processor-executable instructions or data 250 can, for example, include a basic input/output system (BIOS) 252, an operating system 254, drivers 256, communication instructions or data 258, input instructions or data 260, output instructions or data 262, motion instructions or data 264, and executive instructions or data 266.

Exemplary operating systems for operating system 254 include ANDROID™, LINUX®, and WINDOWS®. The drivers 256 include processor-executable instructions or data that allow processor(s) 204 to control circuitry of robot 200. The processor-executable communication instructions or data 258 include processor-executable instructions or data to implement communications between the robot 200 and an operator console or terminal, a computer, or the like. The processor-executable input instructions or data 260 guide robot 200 in processing input from sensors in input subsystem 212. Processor-executable output instructions or data 262 guide the robot 200 in interacting within the environment via components of manipulation subsystem 218 or output subsystem 214. Processor-executable motion instructions or data 264 guide robot 200 in moving within its environment via components in propulsion or motion subsystem 216. For example, processor-executable motion instructions or data 264 may perform motion planning, inverse kinematics, or other motion related tasks. Processor-executable motion instructions or data 264 may implement, in part, various methods described herein, including those in and in relation to FIG. 4 and FIG. 7. The processor-executable motion instructions or data 264 may, when executed, generate processor-executable robot control instructions, which when executed, causes robot 200 to perform one or more actions.

The processor-executable executive instructions or data 266 guide the robot 200 in reasoning, problem solving, planning tasks, performing tasks, and the like. The processor-executable executive instructions or data 266, when executed, may guide the robot 200 to determine an action in view of environment information, simulation information, and augmented reality information. The processor-executable executive instructions or data 266 may implement, in part, various methods described herein, including those in and in relation to FIG. 6, FIG. 7, and FIG. 8.

Input subsystem 212 comprises sensors or transducers that acquire data for the robot. The data includes sensor information. Sensor information includes environmental sensor information representative of environmental conditions external to robot 200. Sensor information includes robotic conditions or state sensor information representative of conditions or states of the robot including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Exemplary sensors include camera 220 and microphone 222. Sensor information can, for example, include diagnostic sensor information that is useful in diagnosing a condition or state of the robot 200 or environment in which robot 200 operates. For example, such sensors may include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array).

The output subsystem 214 comprises one or more output devices. The output subsystem 214 allows robot 200 to send signals into the robot's environment. Example output devices are speakers, displays, lights, and the like. Robot 200 may communicate with an agent, such as, a person, and another robot.

Figure 3:
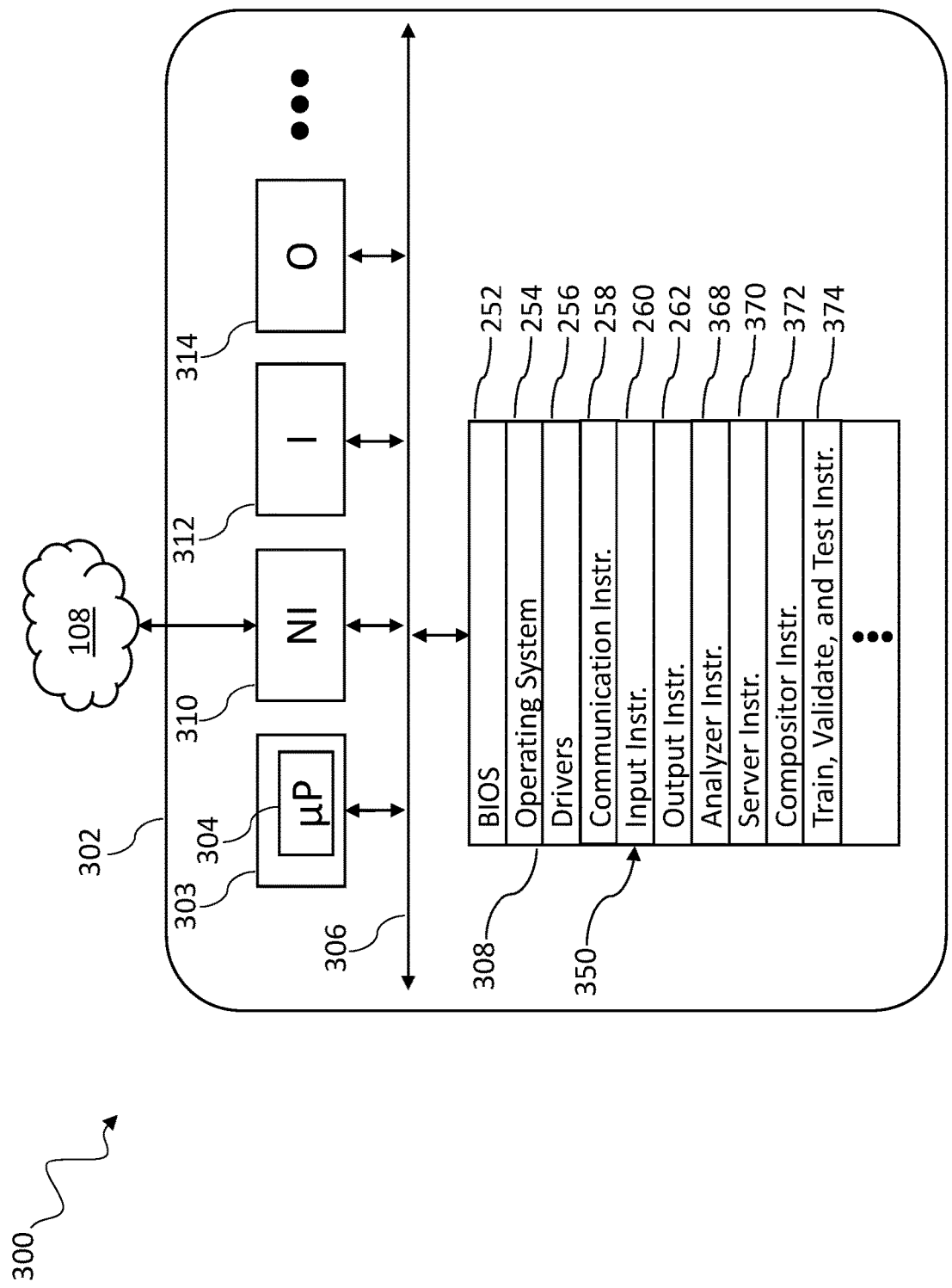
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides a bi-directional communicative coupler among system 300 and other systems (e.g., processor-based devices associated with observers, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206.

Storage device(s) 308 includes or stores processor-executable instructions or data 350 associated with the operation of system 300, or system 100. Processor-executable instructions or data (even reference numbers 252-262) are described herein and with appropriate changes are applicable to system 300, e.g., absence of a motion subsystem. In various implementations, storage device(s) 308 includes or stores one or more of: processor-executable analyzer instructions or data 368, processor-executable server instructions or data 370, processor-executable compositor instructions or data 372, and processor-executable train, validate, test instructions or data 374. The processor-executable analyzer instructions or data 368, processor-executable server instructions or data 370, processor-executable compositor instructions or data 372, and processor-executable train, validate, test instructions or data 374 may implement, in part, various methods described herein, including those in and in relation to FIGS. 5-9.

Processor-executable analyzer instructions or data 368, when executed by control subsystem 304, generates processor-executable robot control instructions, such as, autonomous robot control instructions. Processor-executable server instructions or data 370, when executed by processor(s) 304, guide system 300 to coordinate the operation of system 100, act as a mediator between robots 102, computer system 106, coordinate the operation of system 400, and the like. Processor-executable compositor instructions or data 372, when executed by processor(s) 304, guide system 300 create augmented reality data. The processor-executable compositor instructions or data 372 may, in part, implement various systems, devices, articles, and methods described herein, including those in and in relation to FIGS. 4-7, and 9. The processor-executable compositor instructions or data 372 may implement, in part, various methods described herein including method 500, method 600, method 700, and method 900 including at 505, 509, 606, and 908.

The processor-executable compositor instructions or data 372, when executed, may, cause control subsystem 303, or the like, to composites environment information and item information, create augmented reality data, render a representation of a virtual item disposed within a representation of an environment based on pose information about a robot. The processor-executable compositor instructions or data 372 may accept as environment information a live-action plate for use in visual augmented reality. The processor-executable compositor instructions or data 372 may accept as environment information an environmental sound recording. The processor-executable compositor instructions or data 372 may accept as input i) models for items or ii) animation elements or assets. A model for an animation asset may include, as defined in appropriate data structures, representations of any one or more of polygons, vertices, sprites, texture maps, location, and orientation. The processor-executable compositor instructions or data 372 may apply various transformations, as defined in appropriate processor-readable data or processor-executable instructions, to an animation asset including transformations such as translate, deform, scale, and rotate. The processor-executable compositor instructions or data 372 may create visual, haptic, or audio composite representations of environment, and simulation. The processor-executable compositor instructions or data 372 may retain a representation of a real item in an environment and replace, augment, overlay, or otherwise alter a representation of a background to the item.

The processor-executable train, validate, test instructions or data 374, when executed by processor(s) 304, guide system 300 to train, validate, and test an agent with augmented reality data. Processor-executable train, validate, test instructions or data 374 may, in part, implement various systems, devices, articles, and methods described herein, including those in and in relation to FIGS. 4-9. The processor-executable train, validate, test instructions or data 374, when executed, may implement, in part, various methods described herein including method 500, method 600, method 700, method 800, and method 900.

Figure 4:
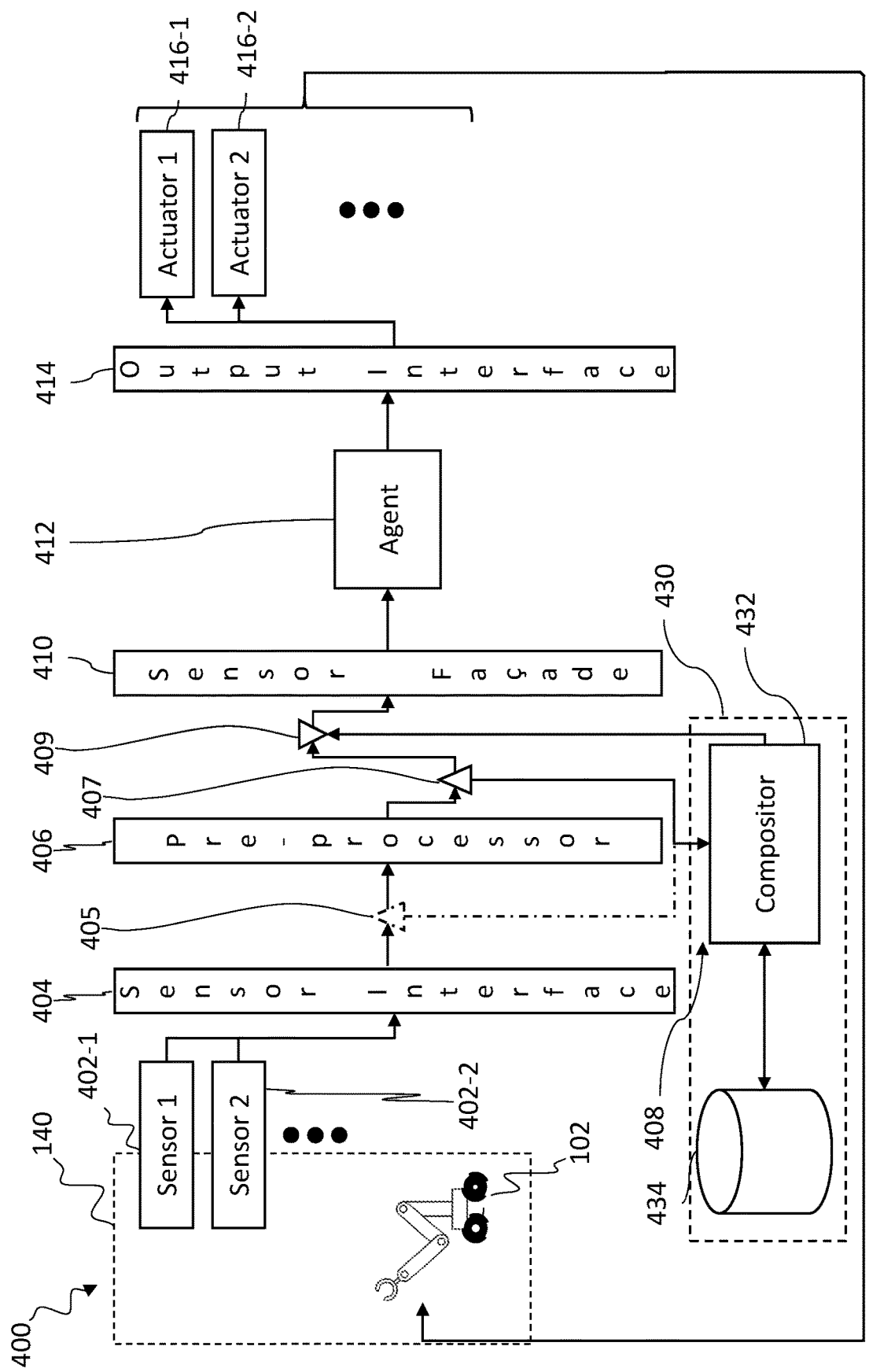
FIG. 4 illustrates, in a schematic view, an exemplary system that may be used to train, validate, or test agents which may control robots based augmented reality data.

FIG. 4 illustrates, in a schematic view, an exemplary system 400 in accordance with the present devices, articles, and methods. System 400 includes at least one processor-based device that implements one or more components included in system 400.

System 400 includes an environment 140 associated with a robot 102. For example, environment 140 is the environment (e.g., surroundings) to the robot 102, e.g., an electro mechanical device. System 400 includes a plurality of sensors 402-1, 402-2 (only two shown, collectively 402). Plurality of sensors 402 include sensors that provide information about environment 140. The plurality of sensors 402 may be physically coupled to robot 102, fixed in place in environment 140, moveable in environment 140, or the like. Examples of sensors include visual sensors (e.g., cameras and other imagers), audio sensors, and haptic sensors. For example, a first sensor 402-1 could be a touch or tactile sensor mounted on robot 102, and a second sensor 402-2 could be a camera disposed in a superior location to robot 102 to image some or all of robot 102 or environment 140.

In some implementations data from sensors 402 is fed to a sensor interface 404. Sensor interface 404 allows one or more components of system 400 to access sensor data. The sensor data, which may be referred to as raw or unprocessed sensor data, may pass from sensor interface 404 to optional extract point 405 and to pre-processor 406. Some the sensor data may be extracted at the optional extract point 405. Pre-processor 406, an optional component of system, may pre-processor the raw sensor data. For example, denoise, change format, change encoding, or the like. When pre-preprocessed, pre-processed sensor data passes to extract point 407. Some the pre-processed sensor data may be extracted at the extract point 407. In operation, the extract point 407 may be selectively operated to extract data as directed by a controller or to extract all data. System 400 includes augmented reality subsystem 430 that itself may include a compositor 432 and storage device 434. The pre-processed sensor data is fed to input 408 of the augmented reality subsystem 430. The raw sensor data may be fed to input 408 of the augmented reality subsystem 430. Compositor 432 may access storage device 434 to retrieve one or more models for one or more virtual items.

Compositor 432 creates composite or composited data based on data from sensors 402, and one or more models for one or more virtual items. Composite data includes a representation of at least part of environment 140 and a representation of a virtual item. For example, the compositor 432 may create a representation of the virtual item as if the representation were disposed within the environment. In some implementations, compositor 432 is present and provides an interface without the augmented reality subsystem 430. In some implementations, storage device 434 is local to compositor 432 and in some implementations storage device 434 communicatively coupled to compositor 432.

Composite data, such as, sensor data composited with simulation data (e.g., overlaid, augmented, replaced) is provided by augmented reality subsystem 430 and passes to merge point 409. From merge point 409 the composite data passes to a sensor façade 410. In various implementations, the sensor façade 410 includes an interface that is same as sensor interface 404.

System 400 includes one or more agents that may be trained, validated, tested, or deployed against the composite data. Only one agent 412 is shown in FIG. 4. Agent 412, conditioned on composite data, determines an action to perform. For example, the agent 412 selects an action for a robot to perform.

In some implementations, agent 412 creates action information that represents and defines what a robot can do, i.e., a declarative action, and/or how a robot may perform the action, i.e., imperative action. In some implementations, the action information is processor-executable robot control instructions, which when executed, cause a robot to perform an action. The action information may be autonomous processor-executable robot control instructions.

System 400 can include an output interface 414 that may be part of an output subsystem. Examples, of output subsystems include output subsystem 214, motion subsystem 216, and manipulation subsystem 218. Output interface 414 may be communicatively coupled to a plurality of actuators 416-1, 416-2 (collectively) included in robot 102. For example, a first actuator 416-1 may be an actuator in a motion subsystem of robot 102 and a second actuator 416-2 may be an actuator in a manipulator subsystem of robot 102. The agent 412 may create processor-executable instructions which when executed causes the robot 102 to perform an action. The action may be part of a task or task pipeline. Herein action is used in singular for clarity but does include the plural.

Figure 5:
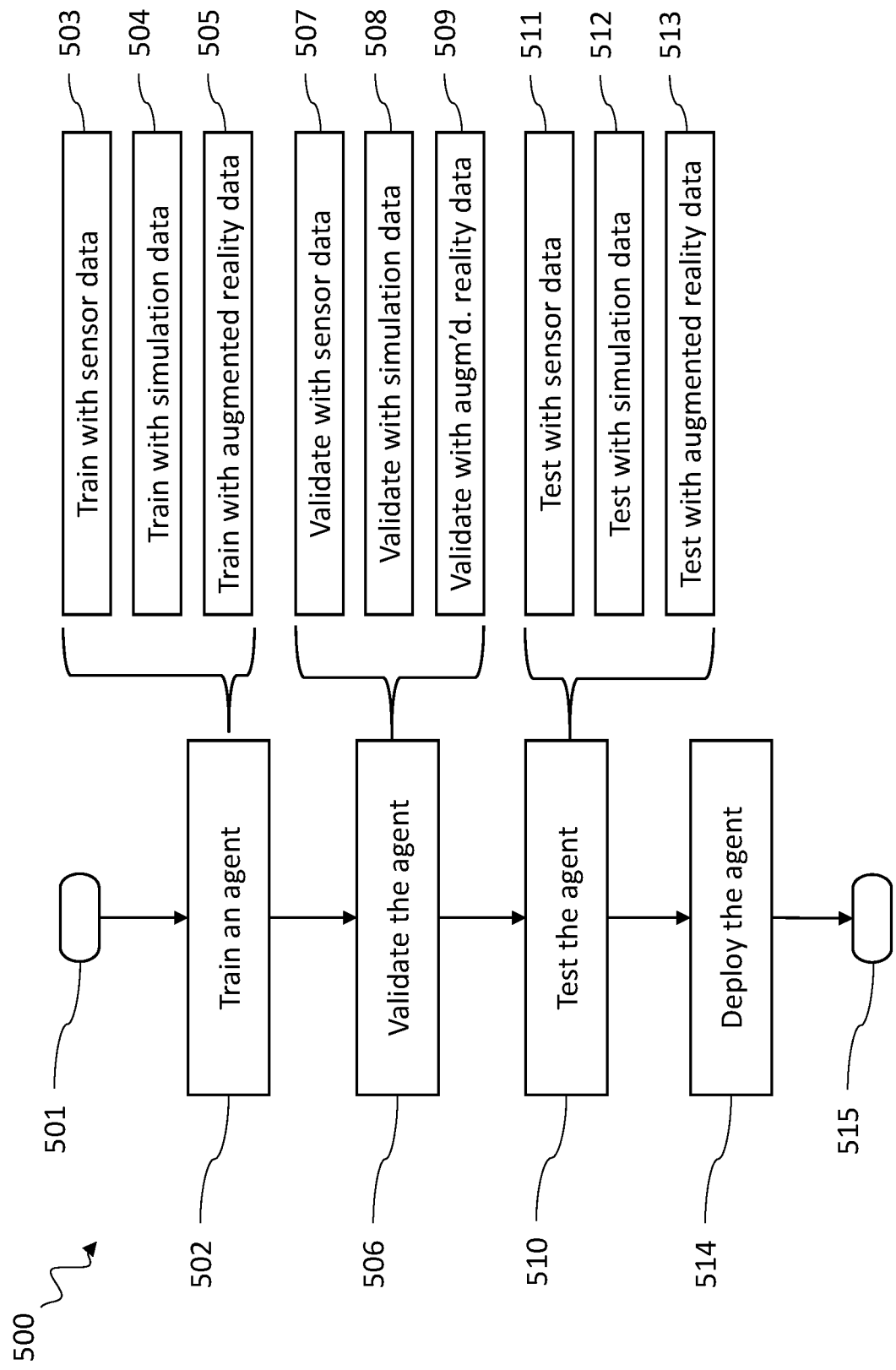
FIG. 5 is a flow-diagram illustrating an implementation of a method of operation for a system including as input sensory information, simulation information, or augmented reality information.

FIG. 5 shows method 500 executable by a controller, such as circuitry or at least one hardware processor, for operation in a robotic system. Method 500, in part, how an agent, such as agent 412, may be presented with augmented reality data. Those of skill in the art will appreciate that other acts may be included, removed, and/or varied or performed in a different order to accommodate alternative implementations. Method 500 is described as being performed by a controller, for example, a control subsystem or processor(s) in computer system 106 or system 200, in conjunction with other components, such as those found in, system 100, computer system 106, robot 200, and system 300. However, method 500 may be performed by multiple controllers or by another system.

For performing part or all of method 500, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable storage devices. For performing part or all of method 500 one or more robots may be included in the operation of a robotic system. Exemplary robots and components are described herein.

Method 500 begins at 501, for example, in response to an invocation by the controller.

At 502, the controller trains an agent. For example, the controller presents to the agent a set of examples so the agent may learn. At 502, the controller may, for example, present a first set of examples to the agent so the agent can fit a model to the set of examples. In some implementations, training an agent 502 may be implemented in one or more different ways, either individually or in combination. For example, the controller may train the agent with sensor data at 503. Sensor data may include environment information about an environment, or internal information about the internal state of a robot. That is, information received (in)directly from one or more sensors. Additionally or alternatively, the controller may train the agent with simulation data at 504. For example, the simulation data may include a representation of an item or environment created from a model. Additionally or alternatively, the controller may train the agent with augmented reality data at 505. For example, the controller trains an agent with a composite of sensor data and simulation data.

Examples of augmented reality data include a composite of sensor or environment information, representing an environment (e.g., around) in which a robot operates, and item information, representing a virtual item. Part of the environment information (e.g., data) may be overlaid (e.g., visually overlaid) with some or all of the item information. For example, in a composite representation some part of the item information overlays (e.g., variously placed over, above, on top of) some of a representation (e.g., visual representation) of the environment based on the environment information. Part of the environment information may be augmented with some, or all, of the item information (e.g., data). For example, in a composite representation the representation of the environment is augmented (e.g., enlarged, increased in number) by some, or all, of the item information. Part of the environment information may be replaced by some, or all, of the item information. For example, part of the representation of the environment is removed and replaced by some, or all, of the item information (e.g., superimposed). The composite information includes a plurality of components. The composite information could be used to inject a representation of a virtual item into information presented to an agent. For example, pass off a representation (e.g., visual representation) of a virtual item as a real item in an environment without attracting notice.

At 506, the controller validates the agent. For example, the controller presents a second set of examples to the agent to estimate a prediction error for the agent and/or select a model for the agent. For example, the controller may validate the agent with sensor data at 507. Additionally or alternatively, the controller may validate the agent against simulation data at 508. Additionally or alternatively, the controller may validate the agent with augmented reality data at 509. The controller performs validation 506-509 using validation data that is different from training data used in performing the training at 502-505.

At 510, the controller tests the agent. For instance, the controller may present a third set of examples to the agent to test a model used by the agent. For example, the controller may test the agent with sensor data at 511. Additionally or alternatively, the controller may validate the agent against simulation data at 512. Additionally or alternatively, the controller may test the agent with augmented reality data at 513. The controller performs agent testing 510-513 using test data that is different from the training data used in performing the training at 502-505 and that is different from the validation data used in performing the validation at 506-509.

At 514, the controller deploys the agent.

Method 500 ends at 515, for example after one or more acts in method 500 such as act 505. In some implementations, the controller performs a test, e.g., 510 via one or more of the specific testing acts 511, 512, and 513. In some implementations, the controller trains and validates an agent. In some implementation, the controller retains, revalidates, or retests an agent after deploying the agent. For example, perform one or more occurrences of 502 after 514.

Figure 6:
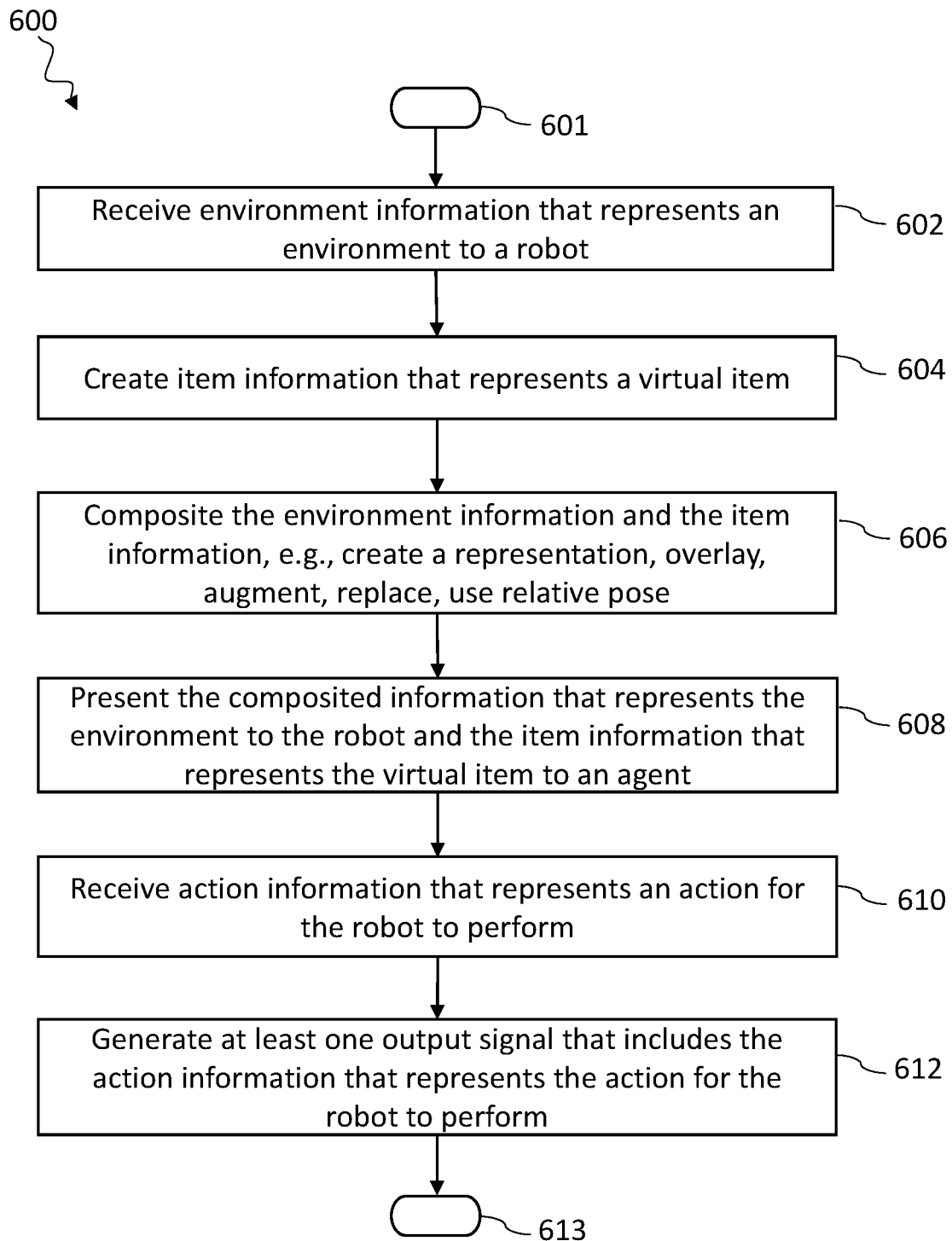
FIG. 6 is a flow-diagram illustrating an implementation of a method of operation for a system to train, validate, or test an agent.

FIG. 6 shows method 600 executable by a controller, such as circuitry or at least one hardware processor, for operation in a robotic system. Method 600, in part, describes how a controller trains, validates, or tests an agent with augmented reality data. Method 600 is described as being performed by a controller, for example, a control subsystem or processor(s) in computer system 106 or system 200, in conjunction with other components, such as those found in, system 100, computer system 106, robot 200, system 300, or system 400. However, method 600 may be performed by multiple controllers or by another system.

Method 600 begins at 601, for example, in response to an invocation by the controller.

At 602 the controller receives one or more input signals from one or more sensors. The input signal(s) includes environment information that represents an environment to a robot. The sensor may be one of a plurality of sensors included in a sensor bank and accessed via a sensor interface, such as, sensor interface 404. The sensor data could be raw or preprocessed. The sensor data could include visual, audio, or haptic data. The controller may store the sensor data as processor-readable data in a processor-readable storage device. In some implementations, the controller receives an input signal from an input subsystem. An input subsystem can include a sensory subsystem, such as, input subsystem 212, and a network interface device, such as, network interface device 310. For example, the network interface device can be coupled to a sensor via a communication channel and a sensory subsystem.

At 604, the controller creates item information that represents a virtual item. The item information may be created long before other parts of method 600 are executed. The item information may be a model of an item that the controller may use to create an item representation of the virtual item. The item representation of the virtual item could include a visual, audio, or haptic representation. The controller may store the item representation as processor-readable data in a processor-readable storage device.

At 606, the controller composites the environment information and the item information. For example, the controller may create or render a representation of the virtual item to appear (e.g., visually appear, aurally appear) as if the representation were disposed within the environment. The controller may overlay some of a representation of the environment information with some or all of the item representation. The controller may augment the representation of the environment information with some, or all, of the item representation. The controller may replace some of the representation of the environment information with some, or all, of the item representation. In some implementations, the controller uses relative pose information to composite the environment information and the item information. The controller may receive pose information that represents a pose of the robot in the environment. The controller may update the item information that represents the virtual item based on the pose information. Thus, the virtual item can be given a realistic relative pose to a robot given the robot's own pose.

In some instances, the composited information may take the form of a two-dimensional view or image. In such implementations, it may be advantageous to render or augment the two-dimensional view with a simulated shadowing, for example based on an estimated three-dimensional geometry of an environment and, or a virtual object. This can be particular useful to provide spatial cues to a human pilot, and may be use for instance in low-level arm or appendage control, In some instances, the composited information may take the form of a two-dimensional view or image. In such implementations, it may be advantageous to render or augment the two-dimensional view with items that the robot will be trained or will otherwise learn to avoid picking. For example, it can be ensured during training and testing that simulated "bad" objects are not in a location that an auto-grasp algorithm would pick from. Also for example, the two-dimensional view may be augment with cropped sensor data that represent problem items, again to train or learn to avoid picking those items.

In some instances, the composited information may take the form of a two-dimensional view or image. In such implementations, it may be advantageous to render or augment the two-dimensional view with distraction items (i.e., items not intended to the picked, but rather to create a distraction). Such may advantageously allow testing to ensure that the robotic system can detect anomalies or discrepancies, including for example human arms reaching into a bin, boxes, and, or miscellaneous three-dimensional models. In such implementations, it may be advantageous to employ "deepfake" techniques to generate a set of believable pixels to stitch together cropped images and simulated items into original sensor data.

In some instances, the composited information may take the form of a three-dimensional view or image. In such implementations, it may be advantageous to render or augment the three-dimensional view with items that the robot will be trained or will learn to pick. For instance, real sensor input can be used to set the stage for a simulation of the dynamics of a simulated target object, in order to use a simulator to learn to pick such objects.

In some instances, the composited information may take the form of a three-dimensional view or image. In such implementations, it may be advantageous to render or augment the three-dimensional view with items that the robot will be trained or will otherwise learn to avoid picking. For example, it can be ensured during training and testing that simulated "bad" objects are not in a location that an auto-grasp algorithm would pick from. Also for example, the three-dimensional view may be augment with cropped sensor data that represent problem items, again to train or learn to avoid picking those items.

In some instances, the composited information may take the form of a three-dimensional view or image. In such implementations, it may be advantageous to render or augment the three-dimensional view with distraction items (i.e., items not intended to the picked, but rather to create a distraction). Such may advantageously allow testing to ensure that the robotic system can detect anomalies or discrepancies, including for example human arms reaching into a bin, boxes, and, or miscellaneous three-dimensional models.

In some instances, the composited information may take the form of aural or sound files or information of the robot's operation. In such implementations, it may be advantageous to render or augment the aural or sound files or information with random clicks and grinding and other aural signs or indications of trouble. This may facilitate validating that any future acoustic anomaly detection models work. In some such implementations, such can take the form of augmenting aural or sound files or information of a robot's correct operation with recorded sounds of associated with abnormal robotic operation.

At 608, the controller may present the composited information to an agent. The agent can include a processor-based device executing processor-executable instructions which when executed determines an action for a robot to perform. The agent can include a human operator at an operator interface, such as operator interface 104.

At 610, the controller receives action information that represents an action for the robot to perform. The controller may receive the action information from an agent. The action information can represent what a robot can do, i.e., a declarative action, and/or how a robot may perform the action, i.e., imperative action. The robot may perform the action via an output subsystem, such as, a motion subsystem and a manipulation subsystem (e.g., motion subsystem 216 or manipulation subsystem 218 shown and described in FIG. 2). The action information may include operator generated processor-executable robot control instructions, received from an operator interface, which when executed cause a robot to perform an action. The action information may include autonomous processor-executable robot control instructions which when executed cause the robot to perform an action.

At 612, the controller creates or generates at least one output signal. The output signal includes the action information that represents the action for the robot to perform. The controller may update a storage device with processor-readable data that represents the action information. The controller may send the action information through a communication channel, such as communication channel 108, to a storage device (e.g., storage device 350), a processor-based device (e.g., system 300), robot (e.g., robot 200), or the like.

Method 600 ends at 613, for example after 612 until invoked again.

Figure 7:
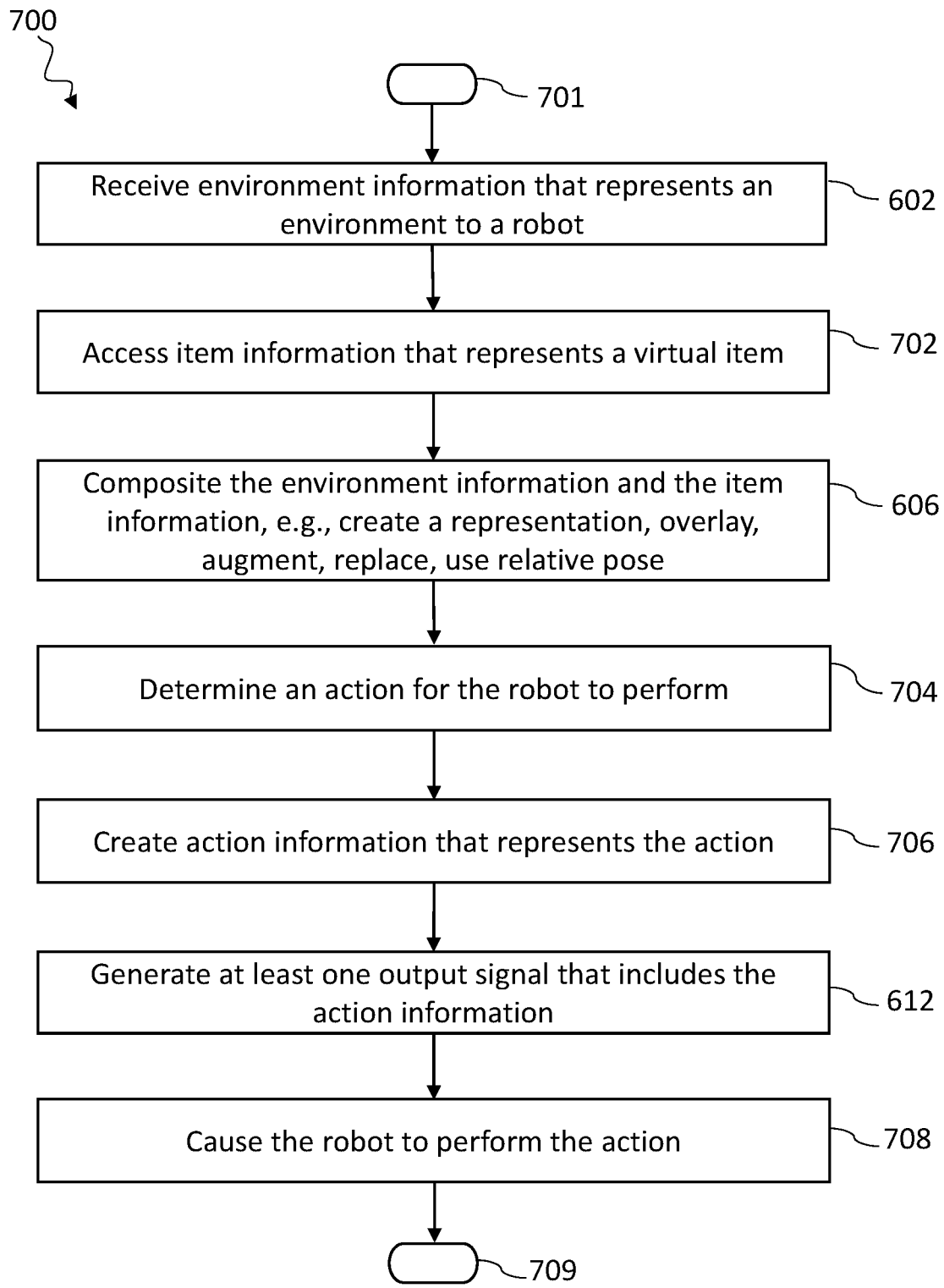
FIG. 7 is a flow-diagram illustrating an implementation of a method of operation for an agent to be trained, validated, or tested based on augmented reality data.

FIG. 7 shows method 700 executable by a controller, such as circuitry or at least one hardware processor, for operation in a robotic system. Method 700, in part, describes how a controller trains, validates, or tests an agent with augmented reality data. Method 700 is described as being performed by a controller, for example, a control subsystem or processor(s) in computer system 106 or robot 200, in conjunction with other components, such as those found in, system 100, computer system 106, robot 200, system 300, or system 400. However, method 700 may be performed by multiple controllers or by another system.

Method 700 begins at 701, for example, in response to an invocation by the controller.

As previously explained, the controller receives an input signal from a sensor at 602. The input signal includes environment information that represents an environment to a robot. The sensor may be one of a plurality of sensors included in a sensor bank and accessed via a sensor interface, such as, sensor interface 404. The sensor data could be raw data, e.g., from sensor interface 404, or preprocessed e.g., from pre-processor 406.

At 702, the controller accesses item information that represents a virtual item. The item information may be available to the controller when method 700 is invoked.

As previously explained, the controller composites the environment information and the item information at 606. For example, the controller may create or render a representation (e.g., visual representation, aural representation) of the virtual item to appear as if the virtual item was disposed within the environment. The controller may create a composited information including environment information that represents the environment to the robot and the virtual item information that represents the virtual item.

At 704, the controller determines (e.g., selects) an action for the robot to perform. The controller may determine the action based on the composited information including environment information that represents the environment to the robot and the virtual item information that represents the virtual item.

At 706, the controller creates action information that represents an action for the robot to perform. The action information may be processor-executable robot control instructions which when executed cause the robot to perform the action.

As previously explained, the controller creates or generates at least one output signal at 612. The output signal includes the action information that represents the action for the robot to perform. The controller may update a storage device with processor-readable data that represents the action information. The controller may send the action information through a communication channel, such as communication channel 108, to a storage device (e.g., storage device 350), a processor-based device (e.g., system 300), robot (e.g., robot 200), or the like.

At 708, the controller causes the robot to perform the action based on the output signal, action information, or processor-executable robot control instructions. The output subsystem may include a motion subsystem or a manipulation subsystem.

Method 700 ends at 709, for example after 708, until invoked again.

Figure 8:
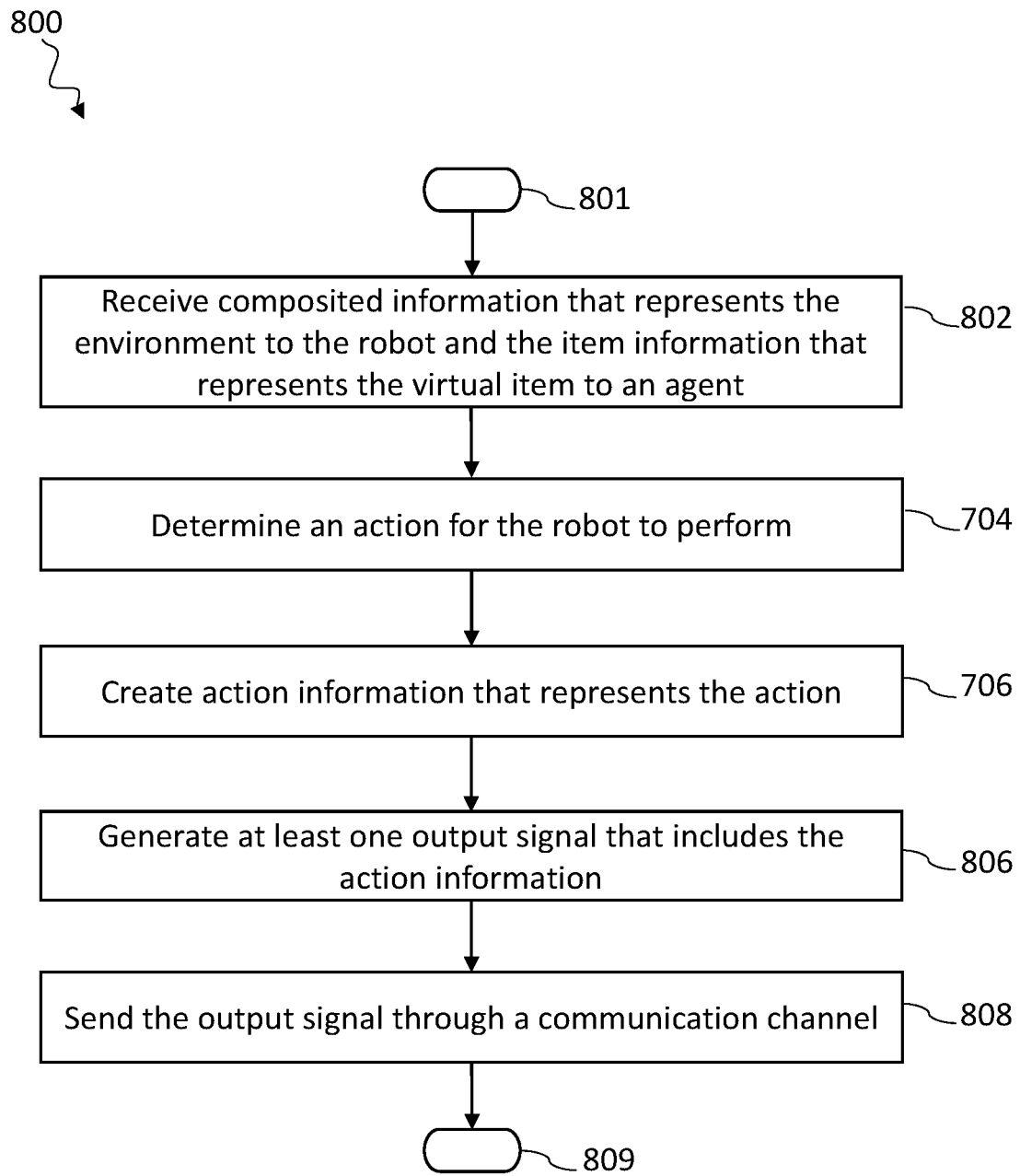
FIG. 8 is a flow-diagram illustrating an implementation of a method of operation for a remote agent to be trained, validated, or tested based on augmented reality data.

FIG. 8 shows method 800 executable by a controller, such as circuitry or at least one hardware processor. Method 800, in part, describes how a controller selects an action in view of augmented reality data. Method 800 is described as being performed by a controller, for example, a control subsystem or processor(s) in computer system 106 or system 200, in conjunction with other components, such as those found in, system 100, computer system 106, robot 200, system 300, or system 400. However, method 800 may be performed by multiple controllers or by another system.

Method 800 begins at 801, for example, in response to an invocation by the controller. For example, in response to a remote procedure call, or in response to 608 in method 600.

At 802, the controller receives composited information including environment information that represents an environment to a robot and item information. For example, the composited information could include environment information from sensor 402-1, and item information retrieved from storage device 434. The composited information may be received by the controller through a communication channel. At 704, the controller determines (e.g., selects) an action for the robot to perform. The controller may determine the action based on the composited information including environment information that represents the environment to the robot and the virtual item information that represents the virtual item.

At 706, the controller creates action information that represents an action for the robot to perform. The action information may be processor-executable robot control instructions which when executed cause the robot to perform the action.

At 806, the controller generates an output signal. The output signal includes the action information that represents the action for the robot to perform.

At 808, the controller sends or transmits the output signal through a communication channel.

Method 800 ends at 809, for example after 808, until invoked again.

Methods 500, 600, 700, and 800 may further include updating one or more storage devices with processor-readable data including environment information, item information, augmented reality information, and action information.

Methods 500, 600, 700, and 800 may further include updating one or more storage devices with processor-readable data that represents further environment information that represents the environment during or after a robot takes an action based on the action information. In methods 500, 600, 700, and 800, a controller may receive from one or more observers, such as, observer 161 shown in FIG. 1, annotations for the actions of one more robots. The controller may update one or more storage devices with processor-readable annotations information based on the annotations for the actions of one more robots and associated, e.g., relationally link, the annotations information to other information including, one or more of, environment information, item information, augmented reality information, action information, and further environment information.

Figure 9:
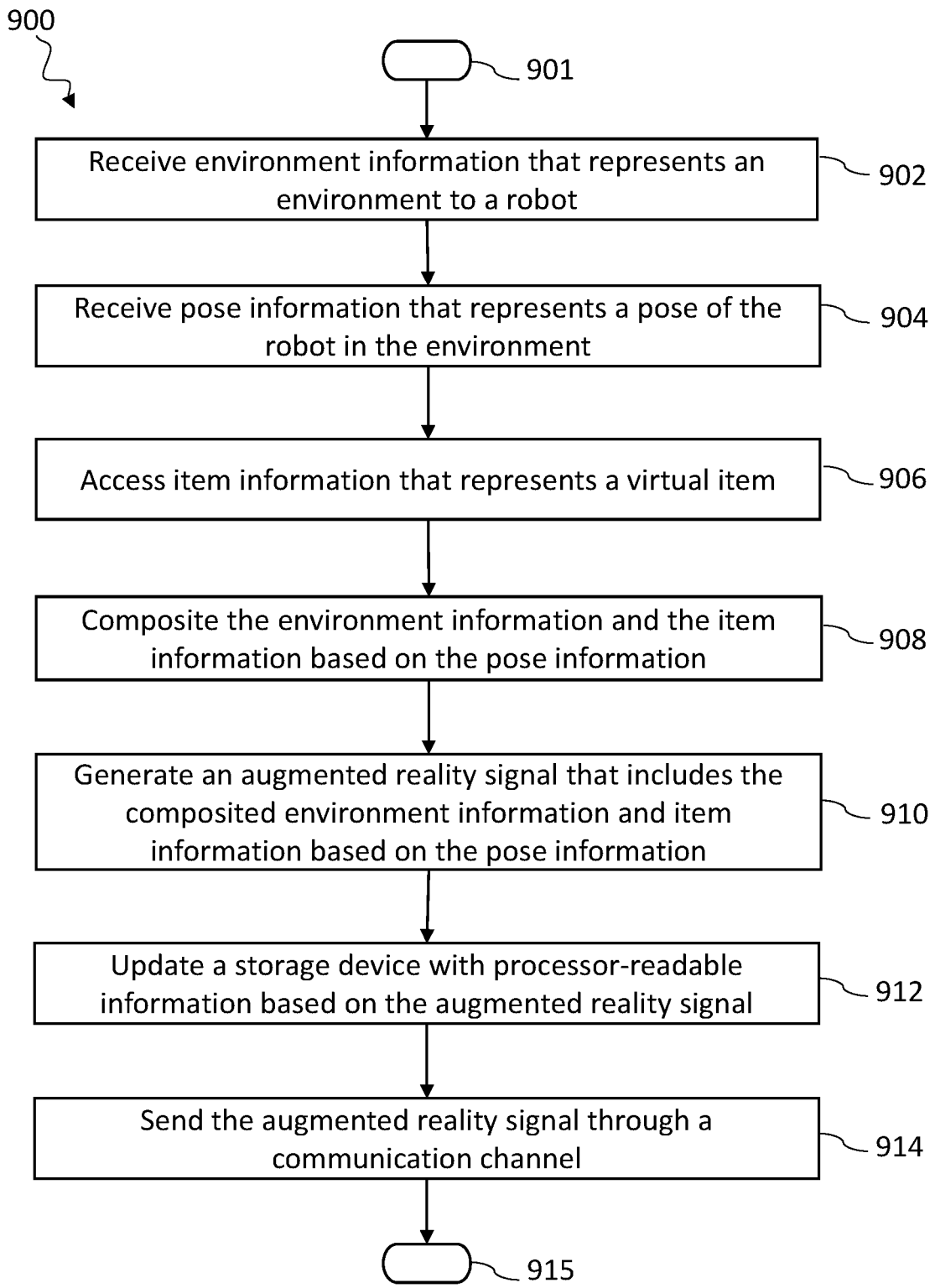
FIG. 9 is a flow-diagram illustrating an implementation of a method of operation in a system or device to create augmented reality data.

FIG. 9 shows method 900 executable by a controller, such as circuitry or at least one hardware processor. Method 900, in part, describes an implementation of how a controller may, in response to execution of processor-executable instructions, cause a system or device to create augmented reality data. Method 900 is described as being performed by a controller, for example, a control subsystem or processor(s) in computer system 106 or system 200, in conjunction with other components, such as those found in, system 100, computer system 106, robot 200, system 300, or system 400. However, method 900 may be performed by multiple controllers or by another system.

Method 900 begins at 901, for example, in response to an invocation by the controller. For example, method 900 may be started by a procedure call during 606 of method 600 or method 700.

At 902, the controller receives environment information that represents an environment to a robot. For example, the controller receives an input signal from a sensor, e.g., microphone, camera. The input signal includes environment information, e.g., audio recording, images, that represents an environment to a robot. The controller may store the environment information as processor-readable data in a processor-readable storage device. In some implementations, the controller receives the environment information from an input subsystem. An input subsystem can include a sensory subsystem, such as, input subsystem 212, and a network interface device, such as, network interface device 310.

At 904, the controller receives pose information that represents a pose of the robot in the environment. Pose can include the position of the center of mass or some point on the robot relative to a known location in the environment and/or relative position of one or more links or joints in the robot.

At 906, the controller accesses item information that represents a virtual item. The controller may retrieve a model for virtual item from a storage device that includes a plurality of virtual items. An example of a storage device that includes a plurality of virtual items is storage device 434 shown in FIG. 4.

At 908, the controller composites the environment information and the item information based on the pose information. For example, the controller renders a representation (e.g., visual representation, aural representation) of the virtual item disposed within the environment based on the environment information, the item information, and the pose information.

At 910, the controller generates an augmented reality signal that includes the composited environment information and item information based on the pose information.

At 912, the controller updates a storage device with processor-readable information based on the augmented reality signal.

At 914, the controller sends the augmented reality signal through a communication channel.

Method 900 ends at 915, for example after 912 or 914, until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or combinations thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs (i.e., processor-executable instructions) executed by one or more processor-based devices (e.g., as one or more sets of processor-executable instructions running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any nontransitory computer-readable storage medium, e.g., memory or disk, for use by or in connection with any processor-related system or method. In the context of this specification, a "computer-readable storage medium" is one or more tangible nontransitory computer-readable storage medium or element that can store processes-executable instruction and/ or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
 a robot including an input subsystem and an output subsystem;
 at least one processor communicatively coupled to the input subsystem and the output subsystem; and
 at least one nontransitory processor-readable storage device communicatively coupled to the at least one processor and which stores processor-executable instructions which, when executed by the at least one processor, cause the at least one processor to:
  receive, at the input subsystem, at least one input signal from at least one sensor wherein the input signal includes environment information that represents an environment to the robot;
  create virtual item information that represents a virtual item;
  composite the environment information that represents an environment and the virtual item information that represents the virtual item to produce composited information;
  train a machine learning model with at least a portion of the composited information to generate a trained machine learning model; and
  create at least one output signal that includes information that represents an action for the robot to perform via the output subsystem based, at least in part, on the trained machine learning model.

2. The system of claim 1 wherein the input subsystem is selected from the group consisting of a sensory subsystem and a network interface device.

3. The system of claim 1 wherein the output subsystem is selected from the group consisting of a motion subsystem and a manipulation subsystem.

4. The system of claim 1 further comprising an operator interface communicatively coupled to the at least one processor.

5. The system of claim 4, wherein, when executed, the processor-executable instructions further cause the at least one processor to:
 send to the operator interface the composited information; and
 receive, at the robot from the operator interface, operator generated processor-executable robot control instructions which, when executed, cause the robot to perform the action.

6. The system of claim 1, wherein, when executed, the processor-executable instructions further cause the at least one processor to:
 receive, at the robot, autonomous processor-executable robot control instructions which, when executed, cause the robot to perform the action.

7. The system of claim 1 further comprising:
 a communication channel communicatively coupled to the at least one processor; and
 wherein, when executed, the processor-executable instructions further cause the at least one processor to:
  send the at least one output signal that includes information that represents the action for the robot to perform via the output subsystem.

8. The system of claim 1, wherein, when executed, the processor-executable instructions further cause the at least one processor to:
 select the action for the robot to perform via the output subsystem based on the composited information.

9. The system of claim 8, wherein, in order to select the action for the robot to perform via the output subsystem based on the composited information, when executed, the processor-executable instructions cause the at least one processor to further:
 select the action in view of the composited information wherein the composited information includes training data;
 select the action in view of the composited information wherein the composited information includes validation data; or
 select the action in view of the composited information wherein the composited information includes test data.

10. The system of claim 1, wherein to composite the environment information that represents an environment to the robot and the virtual item information that represents the virtual item, when executed, the processor-executable instructions cause the at least one processor to further:
 receive pose information that represents a pose of the robot in the environment; and
 update the virtual item information that represents the virtual item based on the pose information that represents a pose of the robot in the environment.

11. A method of operation for a system including at least one processor, at least one sensor in communication with the at least one processor, and a robot including an output subsystem in communication with the at least one processor, the method comprising:
 receiving, at the at least one processor, at least one input signal from the at least one sensor wherein the input signal includes environment information that represents an environment to the robot;
 creating, by the at least one processor, item information that represents a virtual item;
 compositing, by the at least one processor, the environment information that represents the environment to the robot and the item information that represents the virtual item to produce composited information that represents the environment to the robot and the item information that represents the virtual item;
 training, by the at least one processor, a machine learning model with at least a portion of the composited information to generate a trained machine learning model; and
 generating, by the at least one processor, at least one output signal that includes action information that represents an action for the robot to perform via the output subsystem based, at least in part, on the trained machine learning model.

12. The method of claim 11 wherein:
the robot is in communication with an operator interface; and
the method further comprises:
sending to the operator interface the composited information; and
receiving, from the operator interface, operator generated processor-executable robot control instructions which, when executed, cause the robot to perform at least one of the action or another action.

13. The method of claim 11, further comprising:
receiving autonomous processor-executable robot control instructions which, when executed, cause the robot to perform the action via the output subsystem.

14. The method of claim 11 further comprising:
determining, by the at least one processor, the action information that represents an action for the robot to perform via the output subsystem from the composited information.

15. The method of claim 14 wherein determining the action information that represents an action for the robot to perform via the output subsystem further comprises at least one of:
selecting the action in view of the composited information, wherein the environment information that represents the environment to the robot is training data;
selecting the action in view of the composited information, wherein the environment information that represents the environment to the robot is validation data; or
selecting the action in view of the composited information, wherein the environment information that represents the environment to the robot is test data.

16. The method of claim 11 wherein compositing the environment information that represents the environment to the robot and the item information that represents the virtual item further comprises:
receiving, at the at least one processor, pose information that represents a pose of the robot in the environment; and
updating, at the at least one processor, the item information based on the pose information.

17. The method of claim 11 wherein compositing the environment information that represents the environment to the robot and the item information that represents the virtual item further comprises:
rendering a representation of the virtual item disposed within the environment; and
wherein, the representation is selected from the group consisting of: visual representation, haptic representation, and audio representation.

18. The method of claim 11 wherein compositing the environment information that represents the environment to the robot and the item information that represents the virtual item further comprises at least one of:
appending at least a part of the item information that represents the virtual item to the environment information that represents the environment to the robot;
overlaying at least a part of the environment information that represents the environment to the robot with at least a part of the item information that represents the virtual item; or
replacing at least a part of the environment information that represents the environment to the robot with at least a part of the item information that represents the virtual item.

19. The method of claim 11 wherein the action information includes processor-executable instructions which, when executed, cause the robot to perform the action via the output subsystem.

20. The method of claim 11 wherein the at least one processor is in communication with a nontransitory processor-readable storage device, the method further comprising:
updating the nontransitory processor-readable storage device based on the at least one output signal that includes the action information that represents the action for the robot to perform via the output subsystem.

* * * * *